United States Patent
Gao et al.

(10) Patent No.: US 11,917,025 B2
(45) Date of Patent: Feb. 27, 2024

(54) SYSTEM FOR LIFECYCLE PROGRESSION LEVERAGING ADOPTION JOURNEY OF NETWORKING AND COMPUTING EQUIPMENT

(71) Applicant: Cisco Technology, Inc., San Jose, CA (US)

(72) Inventors: Zizhen Gao, San Ramon, CA (US); David C. White, Jr., St. Petersburg, FL (US); Carlos M. Pignataro, Cary, NC (US); Chidambaram Arunachalam, Apex, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 95 days.

(21) Appl. No.: 17/461,339

(22) Filed: Aug. 30, 2021

(65) Prior Publication Data
US 2023/0064763 A1 Mar. 2, 2023

(51) Int. Cl.
*H04L 41/16* (2022.01)
*H04L 67/1025* (2022.01)
*H04L 41/14* (2022.01)
*H04L 67/00* (2022.01)
*H04L 67/1004* (2022.01)

(52) U.S. Cl.
CPC .......... *H04L 67/34* (2013.01); *H04L 41/16* (2013.01); *H04L 67/1004* (2013.01); *H04L 67/1025* (2013.01)

(58) Field of Classification Search
CPC ..... H04L 67/34; H04L 41/16; H04L 67/1004; H04L 67/1025
See application file for complete search history.

(56) References Cited

U.S. PATENT DOCUMENTS

| | | | | |
|---|---|---|---|---|
| 9,983,853 | B2* | 5/2018 | Shi | G06F 11/3006 |
| 2005/0283394 | A1* | 12/2005 | McGloin | G06Q 30/02 705/7.32 |
| 2006/0123389 | A1* | 6/2006 | Kolawa | G06F 11/3616 717/124 |
| 2009/0224038 | A1* | 9/2009 | Oestreicher | G06Q 10/06375 235/385 |
| 2009/0254572 | A1* | 10/2009 | Redlich | G06Q 10/06 |

(Continued)

*Primary Examiner* — Aftab N. Khan
(74) *Attorney, Agent, or Firm* — Edell, Shapiro & Finnan, LLC

(57) ABSTRACT

Methods are provided in which a computing device obtains telemetry data associated with a network technology used in an enterprise network and an enterprise network profile that includes information about the complexity of the enterprise network. The network technology is deployed at one or more devices of the enterprise network. The methods further include the computing device determining, based on the telemetry data, for each deployment of the network technology, a current stage from a plurality of stages of an adoption lifecycle to which the network technology progressed, determining a time estimate for completing the current stage of the adoption lifecycle, based on the enterprise network profile and an adoption benchmark generated from a plurality of activities performed for progressing along the adoption lifecycle, and evaluating an adoption of the network technology, using the time estimate, to progress the network technology along the lifecycle.

20 Claims, 6 Drawing Sheets

(56) References Cited

U.S. PATENT DOCUMENTS

| | | | |
|---|---|---|---|
| 2009/0327049 A1* | 12/2009 | Kisin | G06Q 10/06375 705/7.31 |
| 2010/0305994 A1* | 12/2010 | Gaskell | G06Q 10/067 705/348 |
| 2011/0106575 A1* | 5/2011 | Allam | G06Q 10/06 705/7.11 |
| 2014/0278711 A1* | 9/2014 | Fuller | G06Q 10/06315 705/7.25 |
| 2015/0052503 A1* | 2/2015 | Ligman | G06F 3/04842 717/125 |
| 2016/0055079 A1* | 2/2016 | Hanna | G06F 11/3684 717/135 |
| 2016/0189082 A1* | 6/2016 | Garrish | G06Q 30/01 705/7.39 |
| 2018/0075465 A1 | 3/2018 | Conti et al. | |
| 2018/0088939 A1* | 3/2018 | Strachan | G06N 7/01 |
| 2018/0307998 A1* | 10/2018 | Strachan | G06N 7/01 |
| 2020/0159525 A1 | 5/2020 | Bhalla et al. | |
| 2020/0334921 A1* | 10/2020 | Spes | G06F 17/18 |
| 2021/0019133 A1* | 1/2021 | Rusev | H04L 41/20 |
| 2021/0035129 A1* | 2/2021 | Koch | G06Q 30/0202 |
| 2021/0035186 A1 | 2/2021 | Koch et al. | |
| 2021/0090095 A1* | 3/2021 | Sekharan | G06Q 30/0201 |
| 2021/0400116 A1* | 12/2021 | Bugenhagen | H04L 41/0816 |
| 2021/0405906 A1* | 12/2021 | Dong | G06F 3/0683 |
| 2022/0200855 A1* | 6/2022 | Celichowski | H04L 47/781 |
| 2022/0219827 A1* | 7/2022 | Knapp | B64D 41/007 |

\* cited by examiner

500

┌─────────────────────────────────────────────────────────┐
│ Obtaining telemetry data associated with a network      │
│ technology used in an enterprise network and an         │
│ enterprise network profile that includes information    │ 502
│ about complexity of the enterprise network, the network │
│ technology being deployed at one or more devices of     │
│ the enterprise network                                  │
└─────────────────────────────────────────────────────────┘
                             │
                             ▼
┌─────────────────────────────────────────────────────────┐
│ Determining, based on the telemetry data, for each      │ 504
│ deployment of the network technology, a current stage   │
│ from a plurality of stages of an adoption lifecycle     │
│ to which the network technology progressed              │
└─────────────────────────────────────────────────────────┘
                             │
                             ▼
┌─────────────────────────────────────────────────────────┐
│ Determining a time estimate for completing the current  │
│ stage of the adoption lifecycle, based on the enterprise│ 506
│ network profile and an adoption benchmark generated     │
│ from a plurality of activities performed for progressing│
│ along the adoption lifecycle                            │
└─────────────────────────────────────────────────────────┘
                             │
                             ▼
┌─────────────────────────────────────────────────────────┐
│ Evaluating an adoption of the network technology, using │ 508
│ the time estimate, to progress the network technology   │
│ along the adoption lifecycle                            │
└─────────────────────────────────────────────────────────┘

FIG.5

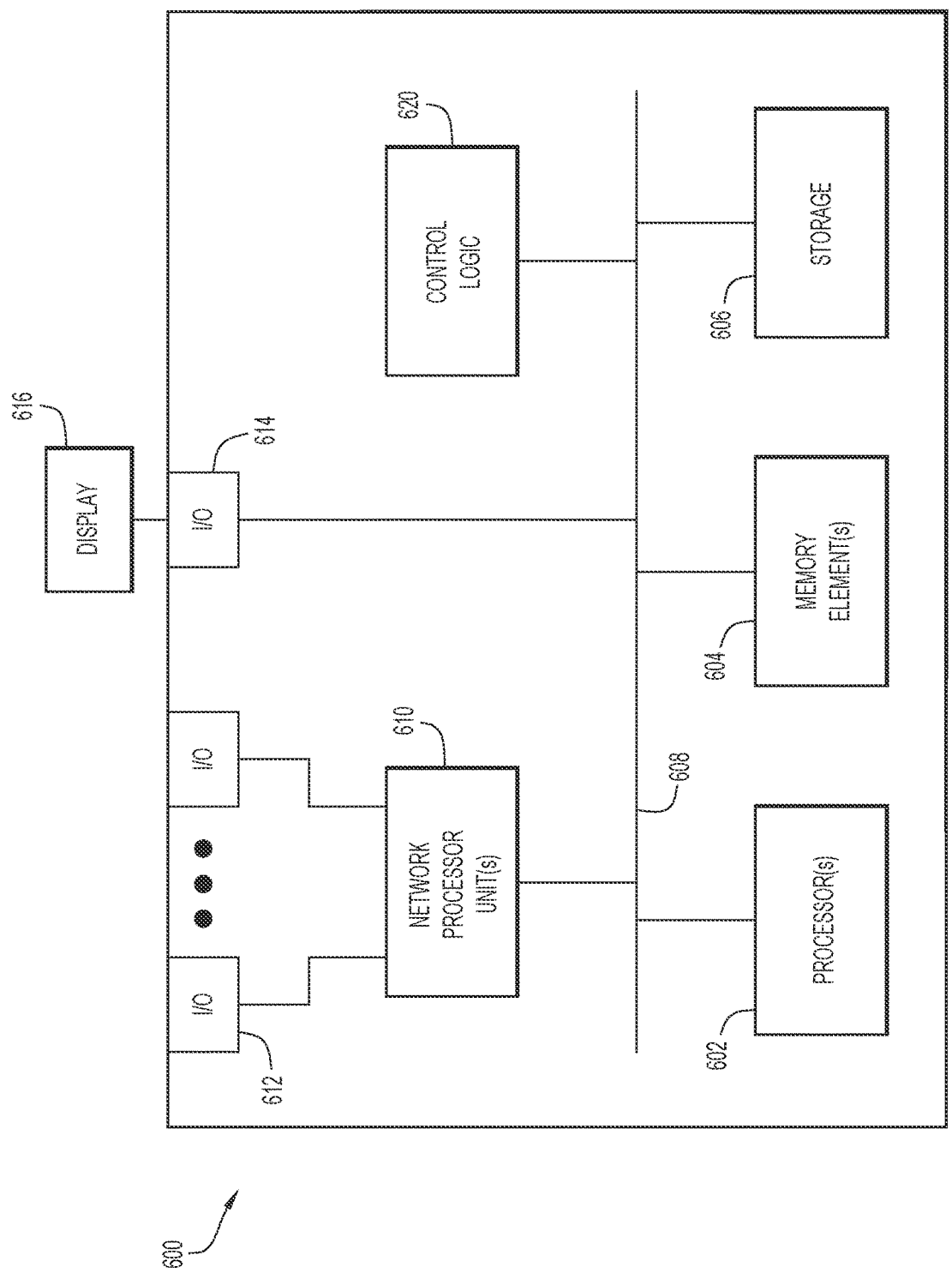

SYSTEM FOR LIFECYCLE PROGRESSION LEVERAGING ADOPTION JOURNEY OF NETWORKING AND COMPUTING EQUIPMENT

TECHNICAL FIELD

The present disclosure relates to computer networks and systems.

BACKGROUND

Enterprise service functions for equipment and software can be burdensome and inefficient. This is particularly the case for enterprises that have large networks or systems of numerous instances and types of equipment and software. Tracking performance, troubleshooting, and integrating new technology and/or updates for networking equipment and software in large networks can be time consuming and often requires support and guidance from providers or third party entities.

BRIEF DESCRIPTION OF THE DRAWINGS

FIG. 5 is a flowchart illustrating a method of evaluating an adoption of a use case of a network technology of an enterprise network using a time estimate to progress the network technology along the adoption lifecycle, according to an example embodiment.

FIG. 6 is a hardware block diagram of a computing device that may perform functions associated with any combination of operations in connection with the techniques depicted and described in FIGS. 1-5.

DESCRIPTION OF EXAMPLE EMBODIMENTS

Overview

Briefly, methods are presented for generating customized baseline data to predict an amount of time for a network technology to complete an adoption journey and/or to complete a particular stage of an adoption lifecycle, to help progress the network technology along the adoption lifecycle.

In one example, a method is provided that includes obtaining telemetry data associated with a network technology used in an enterprise network and an enterprise network profile that includes information about complexity of the enterprise network. The network technology is deployed at one or more devices of the enterprise network. The method further involves determining, based on the telemetry data, for each deployment of the network technology, a current stage from a plurality of stages of an adoption lifecycle to which the network technology progressed. A time estimate is determined for completing the current stage of the adoption lifecycle, based on the enterprise network profile and an adoption benchmark generated from a plurality of activities performed for progressing along the adoption lifecycle. An adoption of the network technology is evaluated using the time estimate, to progress the network technology along the adoption lifecycle.

Example Embodiments

Figure 1:
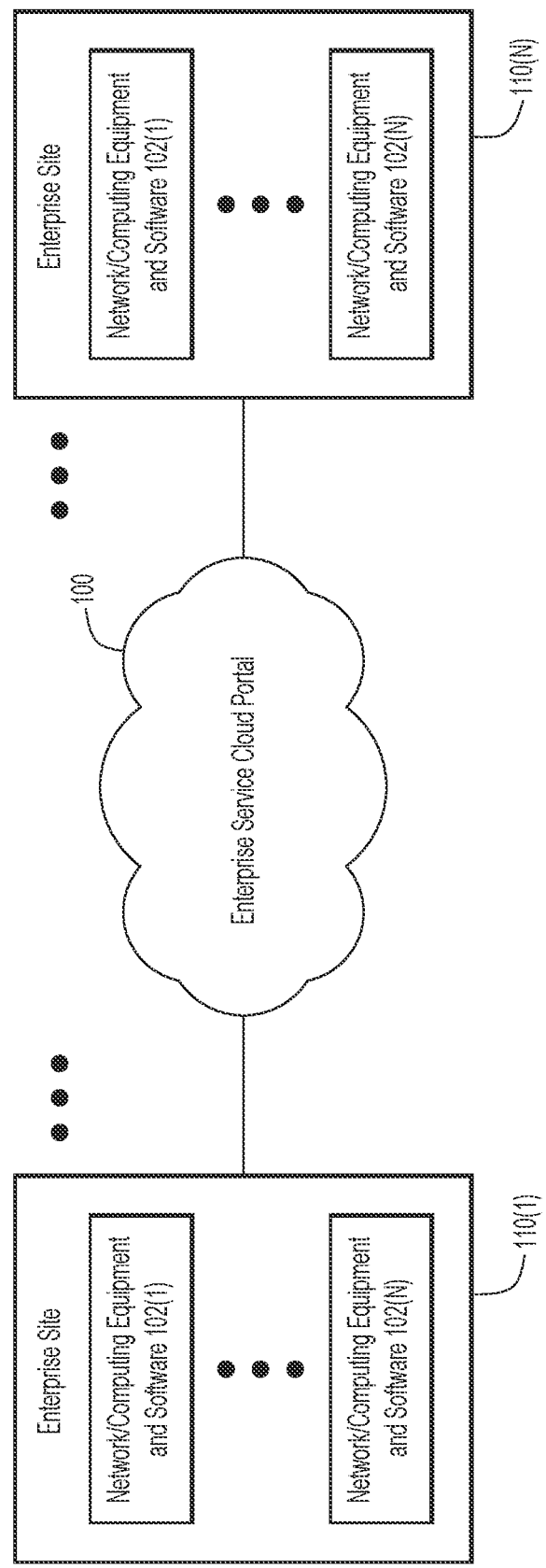
FIG. 1 is a block diagram of a system that includes an enterprise service cloud portal that interacts with network/computing equipment and software residing at various enterprise sites, according to an example embodiment.

FIG. 1 is a block diagram of a system 10 that includes an enterprise service cloud portal (cloud portal) 100 that interacts with network/computing equipment and software 102(1)-102(N) residing at various enterprise sites 110(1)-110(N), or in cloud deployments of an enterprise, according to an example embodiment.

The notations 1, 2, 3, . . . n and a, b, c, n illustrate that the number of elements can vary depending on a particular implementation and is not limited to the number of elements being depicted or described.

The network/computing equipment and software 102(1)-102(N) are resources or assets of an enterprise (the terms "assets" and "resources" are used interchangeably herein). The network/computing equipment and software 102(1)-102(N) may include any type of network devices or network nodes such as controllers, access points, gateways, switches, routers, hubs, bridges, gateways, modems, firewalls, intrusion protection devices/software, repeaters, servers, data storage equipment, and so on. The network/computing equipment and software 102(1)-102(N) may further include endpoint or user devices such as a personal computer, laptop, tablet, and so on. The network/computing equipment and software 102(1)-102(N) may include virtual nodes such as virtual machines, containers, point of delivery (PoD), and software such as system software (operating systems), firmware, security software such as firewalls, and other software products. Associated with the network/computing equipment and software 102(1)-102(N) is configuration data representing various configurations, such as enabled and disabled features. The network/computing equipment and software 102(1)-102(N), located at the enterprise sites 110(1)-110(N), represent information technology (IT) environment of an enterprise.

The enterprise sites 110(1)-110(N) may be physical locations such as one or more data centers, facilities, or buildings located across geographic areas that designated to host the network/computing equipment and software 102(1)-102(N). The enterprise sites 110(1)-110(N) may further include one or more virtual data centers, which are a pool or a collection of cloud-based infrastructure resources specifically designed for enterprise needs, and/or for cloud-based service provider needs.

The network/computing equipment and software 102(1)-102(N) may send to the cloud portal 100, via telemetry techniques, data about their operational states and configurations so that the cloud portal 100 is continuously updated about the operational states, configurations, software versions, etc., of each instance of the network/computing equipment and software 102(1)-102(N) of an enterprise.

The cloud portal 100 is driven by human and digital intelligence that serves as a one-stop destination for equipment and software of an enterprise to access insights and expertise when needed and specific to a particular stage of an adoption lifecycle. Examples of capabilities include assets and coverage, cases (errors or issues to troubleshoot), automation workbench, insights with respect to various stages of an adoption lifecycle and how to progress to the next stage of the adoption lifecycle, and so on. The cloud portal 100 helps enterprise network technologies to progress along an adoption lifecycle based on adoption telemetry and enabled through contextual learning, support content, expert resources, and analytics and insights embedded in context of the company's current/future guided adoption tasks.

A network technology is a computing-based service or a solution that solves an enterprise networking or computing problem or addresses a particular enterprise networking or computing need. The network technology solutions are sometimes offered by service providers and address various aspects of information technology (IT). Some non-limiting examples of network technology solutions include access policies, security and firewall protection services, software image management, endpoint or user device protection, network segmentation and configuration. Some network technology solutions apply to virtual technologies or resources provided in a cloud or one or more data centers. The network technology solution implements a particular enterprise outcome and is often deployed on one or more of the network/computing equipment and software 102(1)-102(N).

For an enterprise-grade technology solution, the deployment process may be complex and confusing to an enterprise. While product guides, documentation, and support resources may be available, it can be challenging to know what is available and then discern what is relevant to the IT environment of the enterprise and to the achievement of desired enterprise outcomes. Further, it is difficult to track the deployment process. To ease the process and accelerate the realization of the value of a network technology, progress of deployment and use of the network technology is tracked using telemetry and guidance specifically tailored to the enterprise and its progression of the network technology is provided.

An adoption refers to the uptake and utilization of a network technology for achieving a desired outcome. A journey refers to end-to-end activities performed by an enterprise when adopting a network technology, including tasks the enterprise performs and defined stages through which it progresses. According to one or more example embodiments, an adoption lifecycle refers to a step-by-step guidance along the adoption journey to accelerate the speed to realization of value of a network technology. For example, the adoption lifecycle may encompass the end-to-end journey stages of: need, evaluate, select, align, purchase, onboard, implement, use, engage, adopt, optimize, recommend, advocate, and accelerate. Leveraging a hybrid combination of explicitly provided human input (either from an enterprise or a service provider) and implicitly derived network telemetry, the adoption lifecycle tracks and visualizes what stage(s) the network technology is at with its deployment(s), provides the next activities needed to make progress toward a desired outcome (called "Use Cases"), and contextualizes a combination of resources (freely available content such as product guides and online community threads and premium content such as topic-based webinars and one on one coaching sessions), which is tagged and associated with the corresponding adoption journey stages and activities being undertaken by the enterprise.

The cloud portal 100 provides an always-on digital portal to accelerate speed-to-value for the enterprise, by delivering the right information at the right time. However, this requires the enterprise to take action to realize that value. In one example embodiment, actions taken by an enterprise are measured and thus, the ability of the enterprise to consume value of the network technology through the adoption lifecycle. The adoption lifecycle guides customers at steps along their adoption journey, by providing relevant steps and clear checklist items, as well as collaborative intelligence to ease and facilitate the technology adoption process.

Figure 2:
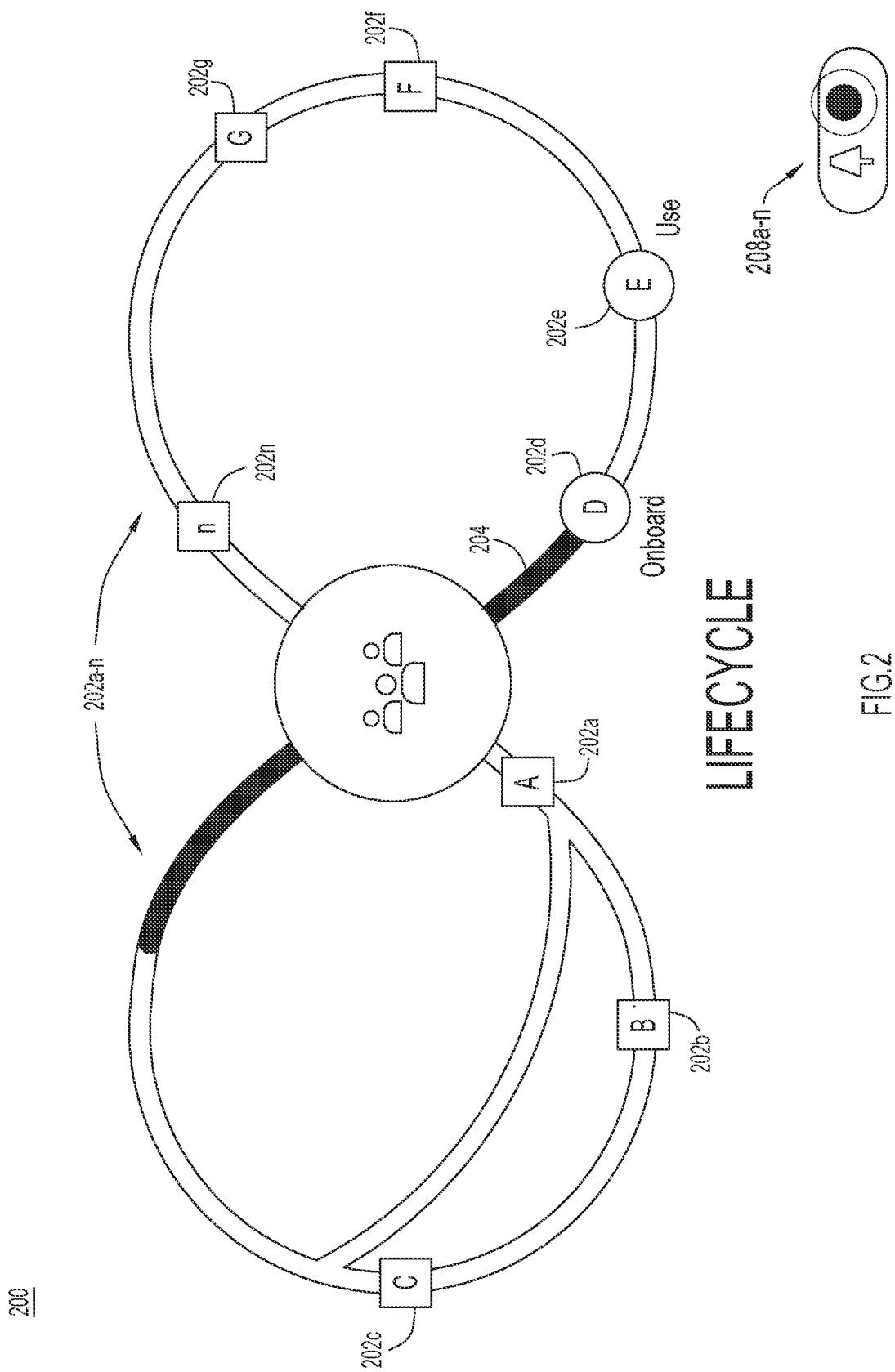
FIG. 2 is a diagram depicting an adoption lifecycle in which adoption of a network technology progresses through various stages, according to an example embodiment.

FIG. 2 is a diagram illustrating an adoption lifecycle 200 in which a network technology progress through various stages, according to an example embodiment. Reference is also made to FIG. 1 for purposes of the description of FIG. 2. The cloud portal 100 generates the adoption lifecycle 200 and monitors the progress of the network technology along the adoption lifecycle 200.

In this non-limiting example, the adoption lifecycle 200 is in a form of a racetrack with various pit stops 202a-n along the way. Each pit stop represents a stage in the adoption lifecycle 200. As a non-limiting example, a first pit stop A (denoted by reference numeral 202a) is a discovery stage in which enterprise needs and requirements for a network technology are identified. A second pit stop B (202b) is an evaluation stage in which various use cases for the network technology may be considered and a provider for the network technology may be selected. A third pit stop C (202c) is an obtaining stage in which the network technology is obtained from the network provider. A fourth pit stop D (202d) is an onboarding stage in which the network technology and its features are introduced and the network technology may be integrated with the enterprise network and its infrastructure. This stage may include performing a change in a configuration of the network/computing equipment and software 102(1)-102(n). A fifth pit stop E (202e) is a use stage in which the network technology is consumed for one or more use cases. A sixth pit stop F (202f) is an engage stage in which the enterprise obtains value from the use of the network technology. A seventh pit stop G (202g) is a maximize value stage in which the enterprise may enable and disable certain features and/or reconfigure one or more of the network/computing equipment and software 102(1)-102(n) to maximize value of the network technology, an nth pit stop N (202n), etc.

Each stage of the adoption lifecycle 200 includes one or more activities that are involved to progress to the next stage. The cloud portal 100 tracks the current progression 204 of the network technology along the adoption lifecycle 200. Additionally, each stage in the adoption lifecycle 200 may include a number of activities that need to be performed at a given stage.

As an example, the fourth pit stop D (onboarding stage) includes 5 activities to onboard the network technology and the fifth pit stop E (use stage) includes 1 activity. The activities may be provided in a form of a checklist and include various actions, such as planning a network controller, installing a network controller, determining compatibility of various assets in the enterprise network, learning about the network controller, planning access policies, etc. The network operator or user may select a particular stage to view the list of activities to perform. The activities include actions to change a configuration of the network/computing equipment and software 102(1)-102(n), such as update to a different software version, install required software, open a port, connect to the network, enable or disable a certain feature of an enterprise asset, etc.

As another non-limiting example, each stage of the adoption lifecycle may include a number of deployments of the network technology, such as 5 deployments of the network technology are at the fourth pit stop D and 1 deployment of the network technology is at the fifth pit stop E. The deployments are at various instances of network/computing equipment and software 102(1)-102(N) at the enterprise sites 110(1) and 110(N).

In additional to providing information and guidance for progressing along the adoption lifecycle 200, the techniques presented herein generate insights 208a-n regarding where an enterprise should be along the adoption lifecycle 200. In particular, the techniques provided herein detect when a network technology is falling behind in the adoption journey and help the network technology to catch up and progress along the adoption lifecycle 200. The techniques presented herein monitor and track progression of the network technologies along their respective adoption lifecycles 200 and generate time estimates for each stage in the adoption lifecycle 200. The time estimates are custom-generated based on the IT environment of the enterprise and based on a type of network technology. By detecting that a network technology is falling behind the estimation time, automated actions may be generated to assist the network technology to progress along the adoption lifecycle 200 and catch up on its adoption journey. The insights 208a-n may include one or more of: (a) a notification that a particular use case or deployment of a network technology is falling behind. (b) an estimated time for the current stage of the network technology and/or the next stage, along the adoption lifecycle 200, and (c) automated actions to progress the network technology along the adoption lifecycle 200.

Figure 3:
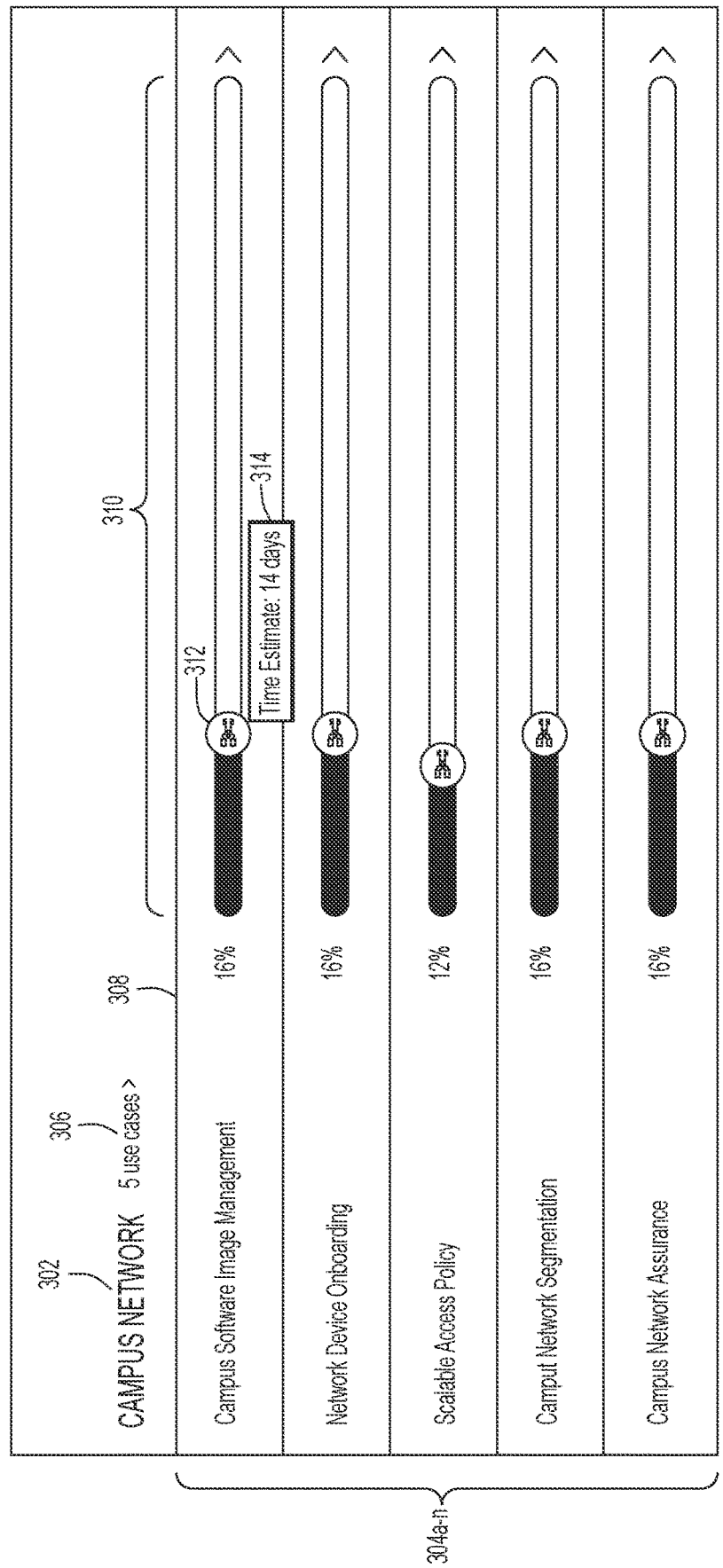
FIG. 3 is a screen shot illustrating a high-level view of a network technology of an enterprise along with its respective state along the adoption lifecycle and a time estimate for each use case of adoption of the network technology, according to an example embodiment.

FIG. 3 is a screen shot illustrating a high-level view 300 of a network technology of an enterprise along with its respective state along the adoption lifecycle and time estimate for each use case of adoption of the network technology, according to an example embodiment. Reference is also made to FIGS. 1 and 2 for purposes of the description of FIG. 3. The cloud portal 100 generates the high-level view 300 based on telemetry data and by threading data from various disparate data sources.

The high-level view 300 involves a system for visualizing, presenting, and tracking the status (hybrid vendor/enterprise/telemetry based input) of an adoption journey along an adoption lifecycle of network technologies, with time estimates, time predictions, and integrated learning and support content/resources embedded in context of the enterprise's current/future guided adoption tasks. This informs the enterprise where it is in the adoption journey, how long it should take, whether the adoption journey is on track, as well as the next steps, based on telemetry and insights.

In this example, the high-level view 300 shows a network technology 302 called campus network. The network technology 302 has a success track such as a network domain success track, a data center success track, a security domain success track, a collaboration domain success track, integrated secure operations success track, etc. The network technology 302 includes one or more use cases 304a-n. The use cases 304a-n are outcomes that an enterprise is trying to achieve with the network technology 302. Non-limiting examples of the use cases 304a-n are a campus software image management use case, a network device onboarding use case, a scalable access policy use case, a campus network segmentation use case, a campus network assurance use case, etc. An indicator 306 shows the total number of use cases (5) for the network technology 302.

For each use case, an overall progress 308, a progression 312 (in a form of a racecar) along the adoption lifecycle 310, and a time estimate 314 are provided. In this non-limiting example, the adoption lifecycle 310 is depicted in a form of a horizontally extending line. The progression 312 indicates the current point along the adoption lifecycle 310 with 100% indicating that the enterprise's intended outcome is achieved, such as the utilization value of the network technology is maximized for this use case. The time estimate 314 indicates the time it should take to complete the current stage in the adoption lifecycle 310 for this use case, based on an enterprise network profile and an adoption benchmark described below. The time estimate 314 is called "a normal completion time estimate" because it is the expected time or the time it should take for this particular network technology of an enterprise to complete the current stage of the adoption lifecycle 310.

Figure 4:
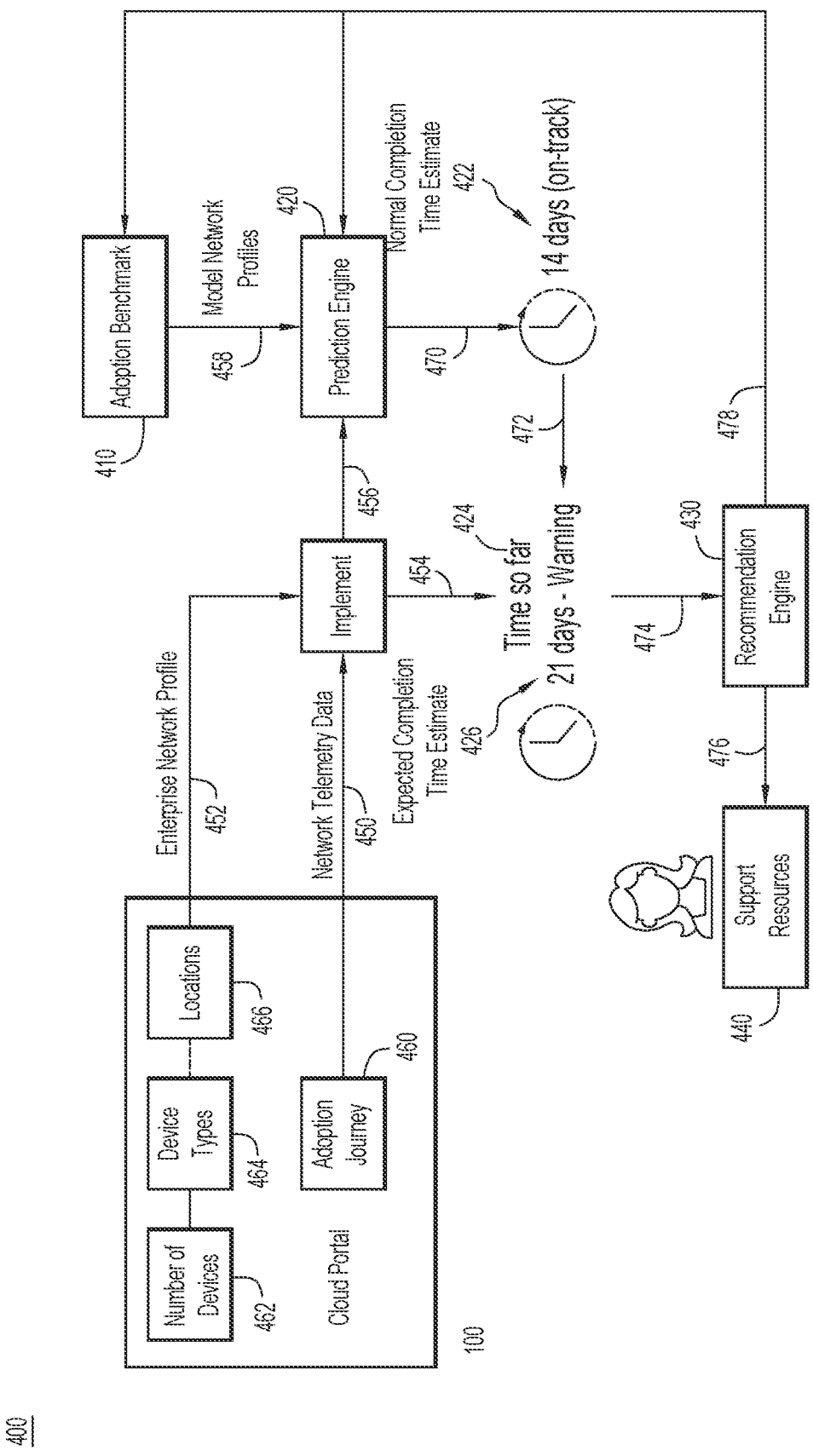
FIG. 4 is a high-level system architecture diagram of a system for generating time estimates and evaluating the progression of a network technology of an enterprise along an adoption lifecycle, according to an example embodiment.

FIG. 4 is a high-level system architecture diagram of a system 400 for generating time estimates and evaluating the progression of a network technology of an enterprise along an adoption lifecycle, according to an example embodiment. Reference is also made to FIGS. 1-3 for purposes of the description of FIG. 4. The system 400 includes the cloud portal 100 of FIG. 1, an adoption benchmark 410, a prediction engine 420, a recommendation engine 430, and support resources 440.

The adoption benchmark 410 is a repository of reference sources for progressing along the adoption lifecycle. The adoption benchmark 410 includes various enterprise network profiles. An enterprise network profile includes but is not limited to: a network size, an enterprise vertical structure, feature usage, device types, device versions, number of devices, number of users, skill set of IT team, timestamps for each data set, etc. As various network technologies of various enterprises progress along the adoption lifecycle (using a guided checklist for example), their activities, the time it took to complete a respective activity, and the time it took to progress to the next stage in the adoption lifecycle (complete the checklist), are captured and used to build the adoption benchmark 410. The adoption benchmark 410 thus provides a reference source generated from adoption journeys of various network technologies of one or more enterprises.

The prediction engine 420 determines the normal completion time estimate 422 (a predicted time) an enterprise should take to complete the current stage in the adoption lifecycle using the reference source provided by the adoption benchmark 410. At each stage in the adoption lifecycle, the prediction engine 420 monitors progress of the network technology and leverages data from the adoption benchmark 410 to predict how long it should take a particular network technology of an enterprise to advance through a particular stage in the adoption lifecycle.

In one example, the prediction engine 420 leverages data from the enterprise network (the enterprise network profile) such as the enterprise network size, an enterprise's vertical structure; feature usage; device types; device versions; a number of devices, a number of users, skill set of the IT team, timestamps for each data set, etc. to generate an accurate time estimate (the normal completion time estimate 422) of how long the enterprise should spend at a specific activity within a specific stage in the adoption lifecycle.

Additionally, the actual time spent by the network technology of the enterprise at the current stage or activity is tracked. The actual time spent is called "time so far" 424. The time so far 424 is tracked based on network telemetry data, as detailed below. Based on the time so far 424 and the normal completion time estimate 422, an expected completion time estimate 426 is determined. Specifically, the expected completion time estimate 426 represents a more accurate estimate of when this particular network technology of the enterprise is likely to complete the current stage or activity. The expected completion time estimate 426 is further computed based on additional telemetry data from the enterprise network and enterprise user activity details.

The prediction engine 420 further evaluates the adoption progress of the network technology of the enterprise using the normal completion time estimate 422. For example, if the network technology progresses to a respective activity early (takes less time than the normal completion time estimate 422), then the network technology is "on track". In this case, the prediction engine 420 takes no further actions and continues to monitor adoption progress and generate the normal completion time estimates 422 for subsequent activities and/or stages in the adoption lifecycle. On the other hand, if progress along the adoption lifecycle for the network technology is taking longer than the normal completion time estimate 422 (e.g., generated based on other enterprises with similar profiles in the adoption benchmark 410), then the network technology is "at-risk". In this case, the prediction engine 420 generates a warning notification to the recommendation engine 430. Specifically, the prediction engine 420 alerts the recommendation engine 430 when a delay in progressing along the adoption lifecycle is detected. The delay may be determined based on the performed actions and remaining actions that need to be performed to progress to the next stage. The delay may be computed based on the time so far 424, the normal completion time estimate 422, and the expected completion time estimate 426 such that if the expected completion time estimate 426 is greater than the normal completion time estimate 422, delay is detected.

The recommendation engine 430 is triggered, by the prediction engine 420, when the network technology is falling behind a predicted timeline schedule for any given stage in the adoption lifecycle and is likely to miss expected checkpoint times. The recommendation engine 430 analyzes data from various data sources to determine one or more actions to help the network technology get back on track such as actions that would accelerate the progression of the network technology along the adoption lifecycle.

The recommendation engine 430 evaluates available options, success of past recommendations to other enterprises, success of past recommendations for this enterprise, to determine an appropriate option that would most likely help accelerate the adoption journey of the network technology. Some non-limiting examples of the options include:

(1) Initiating a proactive action by a network provider by notifying a network specialist of the provider that the network technology is falling behind in the adoption journey and initiating an acceleration session for the enterprise with the network specialist.

(2) Notifying a network operator of the enterprise network, via an email for example, that the network technology is stalled and that assistance is available. The assistance may include an automated action in which the cloud portal 100 changes a configuration of the network/computing equipment and software 102(1)-102(N) at various enterprise sites 110(1)-110(N) where the network technology is deployed, to progress the network technology along the adoption lifecycle. The changes in the configuration may include enabling and/or disabling certain features on the network/computing equipment and software 102(1)-102(N). The automated action set includes actions, tasks, or triggers to progress the network technology, a particular use case or deployment of the network technology, along the adoption lifecycle.

(3) Depending on the current activity and the current stage of the network technology in the adoption lifecycle, providing only the next action to complete or seamlessly completing the next action for the enterprise user and generating an updated notification that the network technology has progressed along the adoption lifecycle.

(4) Displaying a notification in the cloud portal 100 to inform the network operator that the network technology is falling behind in its adoption journey and is not realizing its value, and providing next-steps to progress the network technology along the adoption lifecycle.

(5) Generating and providing the support resources 440 to help progress the network technology along the adoption lifecycle. Some non-limiting examples of the support resources 440 are live and on-demand training or tutoring sessions, webinars, accelerator training, one-on-one sessions, e-learning materials or courses, contextual information from a technical assistance center (TAC) service requests (SRs), product collateral such as instruction manuals and user manuals, technical sites, other learning and training materials, and intellectual capital (IC) generated based on artificial intelligence (AI)/machine learning (ML) and digitization associated with product cases/issues.

(6) Notifying a provider of the network technology so that premium support resources are generated and offered to the enterprise network. The premium resources include a service contract, support contract, warranty for an asset of the enterprise network, etc.

Based on the network technology's further progression along the adoption lifecycle, the recommendation engine 430 proactively updates the action set, a digital copy of the enterprise IT environment, recommended steps, and support resources 440.

In one example embodiment, the recommendation engine 430 selects support resources 440 specific to the network technology (a success track). In another example embodiment, the recommendation engine 430 selects support resources 440 for cross-success tracks that are specific to the success tracks (network technologies of the enterprise) that are falling behind in their adoption journey.

The system 400 further provides a feedback loop mechanism for various enterprise network technologies to progress along the adoption lifecycle within a certain customized time schedule, minimizing the required time of the adoption journey.

The feedback loop mechanism involves at 450, the cloud portal 100 providing network telemetry data. That is, the automated and/or manual workflows of the underlying domain controller(s) take over, using the processes already established within those systems and with user input if required. As the underlying activities are completed in the underlying domain controller(s), the network telemetry data is generated and is fed to the cloud portal 100. The network telemetry data includes information about an adoption journey 460 of various network technologies. The adoption journey 460 includes (1) progression of a particular deployment, use case, or aggregated for the network technology, along the adoption lifecycle such as the progression from the current stage to the next stage, (2) one or more actions performed for the progression, and (3) timestamps for each action, aggregated time for completing the current, etc.

At 452, the cloud portal 100 provides the enterprise network profile. The cloud portal 100 generates the enterprise network profile based on assets of the enterprise network, such as the total number of assets aggregated across various domains (the enterprise sites 110(1)-110(N)), a number of connected assets, asset roles (access, aggregation, branch, core edge), etc. The type of assets may be malware protection (AMP) for endpoints, other software products, and hardware products such as network devices (switch, router, etc.). In this example, the enterprise network profile includes a number of enterprise devices 462, device types 464, and locations 466 of the devices (the enterprise sites 110(1)-110(N)). The types and number of assets vary depending on a particular deployment scenario.

At 454, the time so far 424 for performing an action or completing the current stage in the adoption lifecycle for the network technology is computed and output as time so far 424. The time so far 424 is computed based on the network telemetry data and the enterprise network profile.

At 456, the enterprise network profile and the network telemetry data are provided to the prediction engine 420. At 458, the prediction engine 420 obtains model network profiles from the adoption benchmark 410. The prediction engine 420 analyzes the model network profiles to select one or more model network profiles that are similar to the enterprise network profile. Similarities may be determined based on the number of devices 462, the device types 464, device version, number of users, etc., which are obtained from the enterprise network profile and/or the network telemetry data. The prediction engine 420 generates a benchmark based on the similar network profile(s) and computes the normal completion time estimate 422 for the network technology to complete the current stage in the adoption lifecycle. At 470, the prediction engine 420 outputs the normal completion time estimate 422 as 14 days. According to one example embodiment, the prediction engine 420 may output granular normal completion time estimates specific to a particular activity within an action set of the current stage of the adoption lifecycle, a particular deployment of the network technology, and/or a use case of the network technology, and overall/aggregated time estimates.

The prediction engine 420 evaluates the adoption journey of the network technology of the enterprise network by using the time so far 424 computed at 454 and the normal completion time estimate 422 computed at 470 to determine whether the network technology is on track and to compute the expected completion time estimate 426. In this case, since the expected completion time estimate 426 is 21 days and the normal completion time estimate is 14 days, at 472, the prediction engine 420 generates a warning notification and at 474, activates the recommendation engine 430. That is, the expected completion time estimate 426 exceeds a threshold value set based on the normal completion time estimate 422 computed at 470.

At 476, the recommendation engine 430 generates a set of recommended actions and proactively provides the support resources 440 specific to the current stage, action, deployment type, use case, etc. The set of recommended actions includes actionable triggers such as upgrading to a specific release the affected assets of the network/computing equipment and software 102(1)-102(N) at various enterprise sites 110(1)-110(N).

At 478, the recommendation engine 430 provides the set of recommended actions and telemetry data to both the adoption benchmark 410 and to the prediction engine 420. The recommendation engine 430 learns the recommendation that works for a particular enterprise or network technology of the enterprise such that when the network technology is falling behind, a particular support resource of the support resources 440 may be favored and provided. For example, the prediction engine 420 along with the warning notification may recommend a specific accelerator, a particular support document, or next step or action, thereby providing a faster recommendation. Further, the normal completion time estimate 422 and/or the custom baseline may be adjusted based on the additional telemetry from the recommendation engine 430.

The system 400 uses the custom baseline generated from information about enterprises with similar network profiles (e.g. network complexities, network types, size, device types, feature usage, etc.,) to predict the time required for a network technology to complete its adoption journey, a stage along the adoption lifecycle, and/or a particular activity in the current stage. The system 400 monitors progress of the network technology along the adoption lifecycle using telemetry data and evaluates if the network technology is falling based on the normal completion time estimate 422, the time so far 424, and the expected completion time estimate 426. In this case, the system 400 generates and provides actionable steps, recommendations, and/or support resources 440 to progress the network technology along the adoption lifecycle, thereby minimizing the amount of time required for the enterprise to adopt and/or maximize the value of a given network technology.

The techniques presented herein generate various time estimates of how long a stage in the adoption lifecycle should take for a particular network technology of an enterprise such as the normal completion time estimate 422 and whether the network technology (a particular use case or deployment) is falling behind in the adoption journey based on the expected time estimate 426 and generate recommendations to get back on track.

Specifically, the techniques provide contextual insights indicating where a network technology of the enterprise network should be in the adoption lifecycle based on time spent and the enterprise network profile. The progress of network technologies along the adoption lifecycle is monitored and time required at each stage or action is estimated based on the enterprise's network environment and the technology domain. That is, the techniques measure how long each step and the current stage in the adoption lifecycle is taking (generate customized time predictions of how long the step and/or the current stage should have taken), and then apply automated assistance to help progress the network technology along the adoption lifecycle if needed.

FIG. 5 is a flowchart illustrating a method 500 of evaluating an adoption of the network technology to progress the network technology along the adoption lifecycle, according to an example embodiment. The method 500 may be implemented by a computing device such as a server or a group of servers that execute one or more functions of the cloud portal 100 of FIG. 1.

At 502, the method 500 involves obtaining telemetry data associated with a network technology used in an enterprise network and an enterprise network profile that includes information about complexity of the enterprise network. The network technology is deployed at one or more devices of the enterprise network.

At 504, the method 500 involves determining, based on the telemetry data, for each deployment of the network technology, a current stage from a plurality of stages of an adoption lifecycle to which the network technology progressed.

At 506, the method 500 involves determining a time estimate for completing the current stage of the adoption lifecycle, based on the enterprise network profile and an adoption benchmark generated from a plurality of activities performed for progressing along the adoption lifecycle.

At 508, the method 500 involves evaluating an adoption of the network technology, using the time estimate, to progress the network technology along the adoption lifecycle.

In one form, the method 500 may further include determining, for the network technology, time spent at the current stage of the adoption lifecycle, determining whether the network technology is falling behind in completing the current stage of the adoption lifecycle, based on the time spent, the time estimate, and a predetermined reference time value, and generating a contextual insight based on determining that the network technology is falling behind in completing the current stage of the adoption lifecycle.

In one instance, the method 500 may further involve selecting one or more support resources from a plurality of resources for progressing the network technology to a next stage of the adoption lifecycle, based on the adoption benchmark and the enterprise network profile and providing the contextual insight that includes a notification that the network technology is falling behind and the one or more support resources. The one or more support resources may include an access to a network support, an acceleration training, a tutoring session, a webinar, an electronic learning course, a tutorial, and a product guide.

In another form, the operation of generating the contextual insight may further involve selecting at least two actions from a plurality of actions for progressing in the current stage of the adoption lifecycle, based on the enterprise network profile and the adoption benchmark. The at least two actions may include a change of a configuration of the one or more devices. The operation of generating the contextual insight may further involve performing the at least two actions and generating the contextual insight that includes the change in the configuration of the one or more devices based on performing the at least two actions.

In the method 500, the contextual insight may include an action set that has a plurality of actions to perform to progress to a next stage in the adoption lifecycle. The operation of determining whether the network technology is falling behind may further be based on one or more performed actions in the action set and one or more remaining actions that need to be performed to progress to the next stage.

In one instance, the method 500 may further involve obtaining additional telemetry data indicating the one or more performed actions and time spent for each of the one or more performed actions and adjusting the time estimate and the adoption benchmark, based on the additional telemetry data.

According to one or more example embodiments, the method 500 may further involve analyzing a plurality of model network profiles, each having information about one or more of an enterprise network size, an enterprise vertical structure, types and quantities of network devices, enterprise network connections, quantity of network users, and time related data for actions performed to progress along the adoption lifecycle for one or more network technologies. The method 500 may further involve generating the adoption benchmark based on analyzing the plurality of model network profiles and the enterprise network profile.

In one form, the operation of analyzing the plurality of model network profiles may include selecting at least one model network profile from the plurality of model network profiles that substantially matches the enterprise network profile.

In the method 500, the operation 506 of determining the time estimate for completing the current stage of the adoption lifecycle may include extracting a reference duration for the current stage from the time related data of the at least one model network profile. The reference duration may represent time spent by a reference enterprise network at the current stage of the adoption lifecycle. The operation 506 of determining the time estimate for completing the current stage of the adoption lifecycle may further include computing the time estimate based on the reference duration and similarities between the enterprise network profile and the at least one model network profile.

According to one or more example embodiments, the method 500 may further involve obtaining additional telemetry data that includes a plurality of activities performed to progress the network technology to a next stage of the adoption lifecycle and time spent for each of the plurality of activities and adjusting the time estimate for the next stage of the adoption lifecycle and the adoption benchmark, based on the additional telemetry data.

In one form, the method 500 may further involve determining whether the time estimate exceeds a threshold value and performing a change of a configuration of the one or more devices, based on the time estimate exceeding the threshold value.

FIG. 6 is a hardware block diagram of a computing device 600 that may perform functions associated with any combination of operations in connection with the techniques depicted and described in FIGS. 1-5, including, but not limited to, operations of the computing device or one or more servers that execute the cloud portal 100. Further, the computing device 600 may be representative of one of the network devices. It should be appreciated that FIG. 6 provides only an illustration of one embodiment and does not imply any limitations with regard to the environments in which different embodiments may be implemented. Many modifications to the depicted environment may be made.

In at least one embodiment, computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with one or more memory elements 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to the computing device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 616, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided such as the computing device executing the cloud portal 100 of FIG. 1. The apparatus includes a memory, a network interface configured to enable network communications, and a processor. The processor is configured to perform various operations. The operations include obtaining telemetry data associated with a network technology used in an enterprise network and an enterprise network profile that includes information about complexity of the enterprise network. The network technology is deployed at one or more devices of the enterprise network. The operations further include determining, based on the telemetry data, for each deployment of the network technology, a current stage from a plurality of stages of an adoption lifecycle to which the network technology progressed, determining a time estimate for completing the current stage of the adoption lifecycle, based on the enterprise network profile and an adoption benchmark generated from a plurality of activities performed for progressing along the adoption lifecycle, and evaluating an adoption of the network technology, using the time estimate, to progress the network technology along the adoption lifecycle.

In yet another example embodiment, one or more non-transitory computer readable storage media encoded with instructions are provided. When the media is executed by a processor, the instructions cause the processor to execute a method involving obtaining telemetry data associated with a network technology used in an enterprise network and an enterprise network profile that includes information about complexity of the enterprise network. The network technology is deployed at one or more devices of the enterprise network. The method further involves determining, based on the telemetry data, for each deployment of the network technology, a current stage from a plurality of stages of an adoption lifecycle to which the network technology progressed, determining a time estimate for completing the current stage of the adoption lifecycle, based on the enterprise network profile and an adoption benchmark generated from a plurality of activities performed for progressing along the adoption lifecycle, and evaluating an adoption of the network technology, using the time estimate, to progress the network technology along the adoption lifecycle.

In yet another example embodiment, a system is provided that includes the devices and operations explained above with reference to FIGS. 1-6.

The programs described herein (e.g., control logic 620) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 606 and/or memory elements(s) 604 can store data, software, code, instructions (e.g., processor instructions), logic, parameters, combinations thereof, and/or the like used for operations described herein. This includes the storage 606 and/or memory elements(s) 604 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining, by a computing device, telemetry data associated with a network technology used in an enterprise network and an enterprise network profile that includes information about complexity of the enterprise network, the network technology being deployed at one or more devices of the enterprise network;
determining, by the computing device, based on the telemetry data, for each deployment of the network technology, a current stage from a plurality of stages of an adoption lifecycle to which the network technology progressed;
determining, by the computing device, a time estimate for completing the current stage of the adoption lifecycle, based on the enterprise network profile and an adoption benchmark generated from a plurality of activities performed for progressing along the adoption lifecycle;
evaluating, by the computing device, an adoption of the network technology, using the time estimate, to progress the network technology along the adoption lifecycle;
determining, for the network technology, time spent at the current stage of the adoption lifecycle;
determining whether the network technology is falling behind in completing the current stage of the adoption lifecycle, based on the time spent, the time estimate, and a predetermined reference time value; and
generating a contextual insight based on determining that the network technology is falling behind in completing the current stage of the adoption lifecycle, wherein generating the contextual insight further comprises one of:
selecting one or more support resources from a plurality of resources for progressing the network technology to a next stage of the adoption lifecycle, based on the adoption benchmark and the enterprise network profile and providing the contextual insight that includes a notification that the network technology is falling behind and the one or more support resources, the one or more support resources including an access to a network support, an acceleration training, a tutoring session, a webinar, an electronic learning course, a tutorial, and a product guide, or
selecting at least two actions from a plurality of actions for progressing in the current stage of the adoption lifecycle, based on the enterprise network profile and the adoption benchmark, the at least two actions including a change of a configuration of the one or more devices, performing the at least two actions, and generating the contextual insight that includes the change in the configuration of the one or more devices based on performing the at least two actions.

2. The method of claim 1, further comprising:
analyzing a plurality of model network profiles, each having information about one or more of an enterprise network size, an enterprise vertical structure, types and quantities of network devices, enterprise network connections, quantity of network users, and time related data for actions performed to progress along the adoption lifecycle for one or more network technologies; and
generating the adoption benchmark based on analyzing the plurality of model network profiles and the enterprise network profile.

3. The method of claim 1, further comprising:
obtaining additional telemetry data that includes a set of actions performed to progress the network technology to the next stage of the adoption lifecycle and the time spent for each action in the set of actions; and
adjusting the time estimate for the next stage of the adoption lifecycle and the adoption benchmark, based on the additional telemetry data.

4. A method comprising:
obtaining, by a computing device, telemetry data associated with a network technology used in an enterprise network and an enterprise network profile that includes information about complexity of the enterprise network, the network technology being deployed at one or more devices of the enterprise network;
determining, by the computing device, based on the telemetry data, for each deployment of the network technology, a current stage from a plurality of stages of an adoption lifecycle to which the network technology progressed, wherein each of the plurality of stages includes a different set of tasks to be performed for progressing an adoption of the network technology;
determining, by the computing device, a time estimate for completing the current stage of the adoption lifecycle, based on the enterprise network profile and an adoption benchmark generated from a plurality of activities performed for progressing along the adoption lifecycle; and
evaluating, by the computing device, the adoption of the network technology, using the time estimate, to progress the network technology along the adoption lifecycle.

5. The method of claim 4, further comprising:
obtaining additional telemetry data that includes a set' of activities performed to progress the network technology to a next stage of the adoption lifecycle and time spent for each of the set of activities; and adjusting the time estimate for the next stage of the adoption lifecycle and the adoption benchmark, based on the additional telemetry data.

6. The method of claim 4, further comprising:
determining whether the time estimate exceeds a threshold value; and
performing a change of a configuration of the one or more devices, based on the time estimate exceeding the threshold value.

7. The method of claim 4, further comprising:
generating the adoption lifecycle for the network technology, wherein the adoption lifecycle includes one or more of: a discovery stage, an evaluation stage, an obtaining stage, and an onboarding stage.

8. The method of claim 4, further comprising:
determining, for the network technology, time spent at the current stage of the adoption lifecycle;
determining whether the network technology is falling behind in completing the current stage of the adoption lifecycle, based on the time spent, the time estimate, and a predetermined reference time value; and
generating a contextual insight based on determining that the network technology is falling behind in completing the current stage of the adoption lifecycle.

9. The method of claim 8, further comprising:
selecting one or more support resources from a plurality of resources for progressing the network technology to a next stage of the adoption lifecycle, based on the adoption benchmark and the enterprise network profile; and
providing the contextual insight that includes a notification that the network technology is falling behind and the one or more support resources, the one or more support resources including an access to a network support, an acceleration training, a tutoring session, a webinar, an electronic learning course, a tutorial, and a product guide.

10. The method of claim 8, wherein generating the contextual insight includes:
selecting at least two actions from a plurality of actions for progressing in the current stage of the adoption lifecycle, based on the enterprise network profile and the adoption benchmark, the at least two actions including a change of a configuration of the one or more devices;
performing the at least two actions; and
generating the contextual insight that includes the change in the configuration of the one or more devices based on performing the at least two actions.

11. The method of claim 8, wherein the contextual insight includes an action set that has a plurality of actions to perform to progress to a next stage in the adoption lifecycle, and wherein determining whether the network technology is falling behind is further based on one or more performed actions in the action set and one or more remaining actions that need to be performed to progress to the next stage.

12. The method of claim 11, further comprising:
obtaining additional telemetry data indicating the one or more performed actions and time spent for each of the one or more performed actions; and
adjusting the time estimate and the adoption benchmark, based on the additional telemetry data.

13. The method of claim 4, further comprising:
analyzing a plurality of model network profiles, each having information about one or more of an enterprise network size, an enterprise vertical structure, types and quantities of network devices, enterprise network connections, quantity of network users, and time related data for actions performed to progress along the adoption lifecycle for one or more network technologies; and
generating the adoption benchmark based on analyzing the plurality of model network profiles and the enterprise network profile.

14. The method of claim 13, wherein analyzing the plurality of model network profiles includes:
selecting at least one model network profile from the plurality of model network profiles that substantially matches the enterprise network profile.

15. The method of claim 14, wherein determining the time estimate for completing the current stage of the adoption lifecycle includes:
extracting a reference duration for the current stage from the time related data of the at least one model network profile, the reference duration represents time spent by a reference enterprise network at the current stage of the adoption lifecycle; and
computing the time estimate based on the reference duration and similarities between the enterprise network profile and the at least one model network profile.

16. An apparatus comprising:
a memory;
a network interface configured to enable network communications; and
a processor, wherein the processor is configured to perform operations comprising:
obtaining telemetry data associated with a network technology used in an enterprise network and an enterprise network profile that includes information about complexity of the enterprise network, the network technology being deployed at one or more devices of the enterprise network;
determining, based on the telemetry data, for each deployment of the network technology, a current stage from a plurality of stages of an adoption lifecycle to which the network technology progressed, wherein each of the plurality of stages includes a different set of tasks to be performed for progressing an adoption of the network technology;
determining a time estimate for completing the current stage of the adoption lifecycle, based on the enterprise network profile and an adoption benchmark generated from a plurality of activities performed for progressing along the adoption lifecycle; and
evaluating the adoption of the network technology, using the time estimate, to progress the network technology along the adoption lifecycle.

17. The apparatus of claim 16, wherein the processor is further configured to perform:
determining, for the network technology, time spent at the current stage of the adoption lifecycle;
determining whether the network technology is falling behind in completing the current stage of the adoption lifecycle, based on the time spent, the time estimate, and a predetermined reference time value; and
generating a contextual insight based on determining that the network technology is falling behind in completing the current stage of the adoption lifecycle.

18. The apparatus of claim 17, wherein the processor is further configured to perform:
selecting one or more support resources from a plurality of resources for progressing the network technology to a next stage of the adoption lifecycle, based on the adoption benchmark and the enterprise network profile; and providing the contextual insight that includes a notification that the network technology is falling behind and the one or more support resources, the one or more support resources including an access to a network support, an acceleration training, a tutoring session, a webinar, an electronic learning course, a tutorial, and a product guide.

19. The apparatus of claim 17, wherein the processor is configured to perform the operation of generating the contextual insight by:

selecting at least two actions from a plurality of actions for progressing in the current stage of the adoption lifecycle, based on the enterprise network profile and the adoption benchmark, the at least two actions including a change of a configuration of the one or more devices;

performing the at least two actions; and generating the contextual insight that includes the change in the configuration of the one or more devices based on performing the at least two actions.

20. The apparatus of claim 17, wherein the contextual insight includes an action set that has a plurality of actions to perform to progress to a next stage of the adoption lifecycle, and the processor is configured to perform the operation of determining whether the network technology is falling behind based on one or more performed actions in the action set and one or more remaining actions that need to be performed to progress to the next stage.

* * * * *